Figure 1:
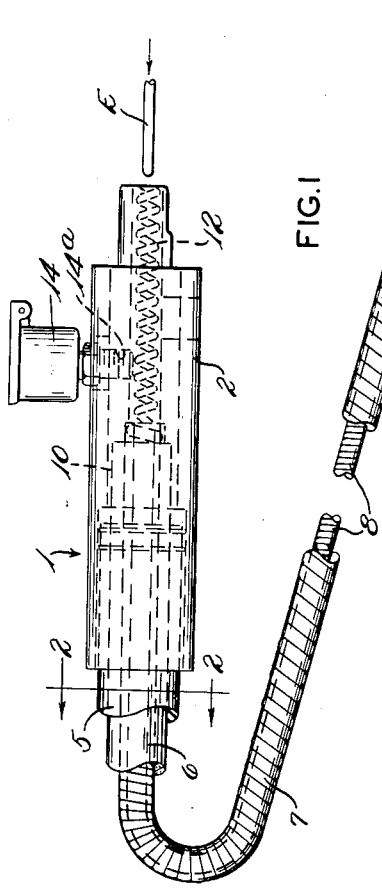

Sept. 25, 1962 E. C. CORNELL, JR 3,056,102
ELECTRODE FEED CABLE AND METHOD OF MAKING SAME
Filed Sept. 29, 1959

INVENTOR.
ELLIOTT C. CORNELL JR.
BY
Oldham & Oldham
ATTYS.

United States Patent Office 3,056,102
Patented Sept. 25, 1962

3,056,102
ELECTRODE FEED CABLE AND METHOD OF MAKING SAME
Elliott C. Cornell, Jr., Brecksville, Ohio, assignor to The Auto Arc-Weld Manufacturing Company, Cleveland, Ohio, a corporation of Ohio
Filed Sept. 29, 1959, Ser. No. 843,294
5 Claims. (Cl. 339—28)

The present invention relates to tubular electrode feed cables, especially to the type of an electrode feed cable as would be used on automatic and semi-automatic welding heads and apparatus where a continuous electrode is forced through the tubular weld cable for weld action, and to methods of making such feed cables.

Heretofore there have been various types of electrode feed cables provided and used extensively commercially in different types of welding heads. Many of these cables have been used extensively without any servicing but some cables require servicing after rough use, or accidental damage thereto. In all events, these feet cables are provided for attachment to the welding apparatus and extend therefrom in a resilient or flexible manner for use by the welder in weld action, as controlled by the welder. These electrode feed cables may be used under varying work conditions where the flexible weld cable is stressed severely, or special loads may accidentally be dumped or placed thereon so as to crush the weld feed cable and require repairs to the cable. In the types of electrode feed cables made heretofore, it has been very difficult, if not impossible to repair these tubular cables when they have been flattened in local areas or where other permanent distortion of the cable has been effected. When coil springs are positioned in these feed cables, as is done in some instances to aid in providing an electrode receiving bore in the feed cable, these springs may break after extensive flexing or other use of the cable so that it has been desirable to replace the coil spring in many instances. However, such coil spring has been difficult to remove from the feed cable because of the intimate bonding of the coil spring to the remainder of the feed cable.

The general object of the present invention is to avoid and overcome difficulties with prior types of tubular electrode feed cables of the type indicated, and to provide a novel and improved type of a feed cable characterized by having a readily replaceable coil spring forming a portion of the cable.

Another object of the invention is to provide an electrode feed cable where a plurality of concentric core members are present therein and with a coiled wire spring being the inner core member relatively loosely received in a carrying sleeve forming a permanent part of the cable assembly.

Another object of the invention is to provide a method of making a flexible feed cable of the class described where a coil spring can be assembled in the bore of a hollow electrical current carrying unit and be adapted to withstand stresses thereafter applied to the feed cable.

A further object of the invention is to provide an electrode feed cable wherein a flexible hollow metal core or sleeve has a resilient insulation coating thereon to form an integral hollow unit adapted to receive a continuous electrode wire therein for passage through a center coil spring in the feed cable.

Another object of the invention is to facilitate the repair and maintenance of electrode cables, particularly to provide a shell for an electrode feed cable which has a replaceable hollow core spring provided as the center bore forming member in the feed cable assembly.

The foregoing and other objects and advantages of the present invention will be made more apparent as the specification proceeds.

The present invention relates to lubricant feeders and electrode cables of the type shown in U.S. Patent No. 2,819,384.

Figure 2:
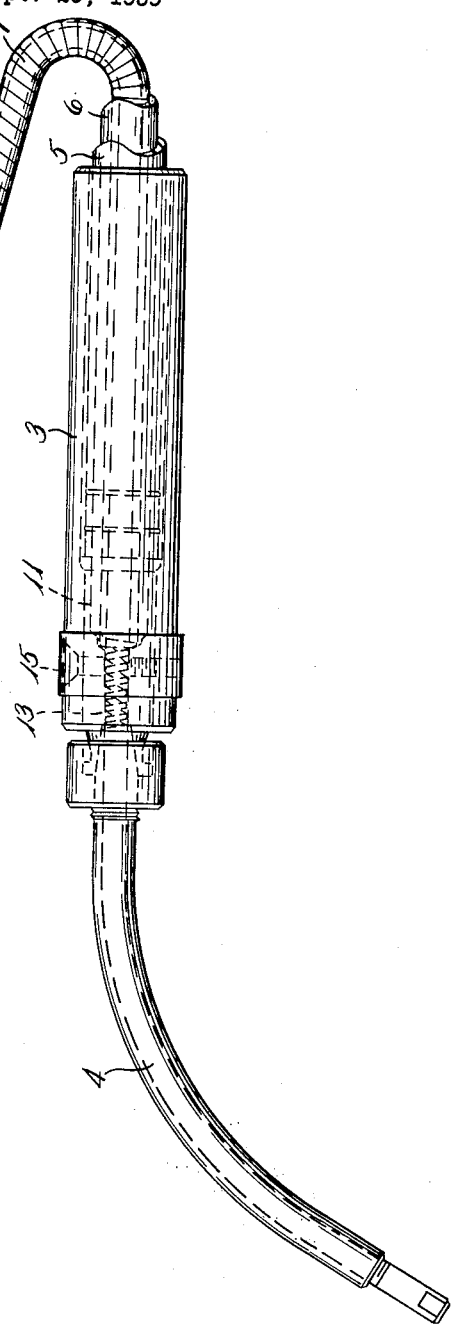
Figure 2:
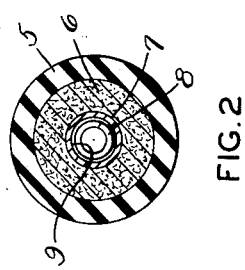

Reference now is particularly directed to the accompanying drawings, wherein:

FIG. 1 is a side elevation of the electrode cable of the invention with portions broken away for clarity; and
FIG. 2 is an enlarged vertical section taken on line 2—2 of FIG. 1.

When referring to corresponding members shown in the drawings and referred to in the specification, corresponding numerals are used to facilitate comparison therebetween.

Generally speaking, the present invention relates to a weld electrode feed cable that comprises a pair of end fitting means, a resilient cable insulation jacket, a flexible, tubular cable-type connector positioned within the cable jacket and tightly engaged therewith, a flexible metal tube received within the cable conductor and integrally bonded thereto to provide a current carrying cable assembly unit having a hollow center bore, and a helically coiled core spring loosely received within the metal tube and extending beyond the ends thereof, the end fitting means receiving the ends of the cable jacket therein and with the ends of the core spring also being positioned within the end fitting means. Suitable means engage the end fitting means and the core spring to secure the core spring in operative but removable engagement with the remainder of the feed cable assembly.

Particular attention now is directed to the details of the structure shown in the enclosed drawings, and FIG. 1 shows an electrode feed cable, or assembly, indicated as a whole by the numeral 1. The feed cable 1 includes a pair of end fitting members, or assemblies 2 and 3, normally made from tubular assemblies of insulation sleeves and metal members, and a resilient cable connects to and extends between these end fitting members 2 and 3. The feed cable 1 is for use in receiving some type of an electrode wire E therein and normally such electrode is forceably fed through the feed cable 1 for automatic or semi-automatic weld action at the end of the cable assembly. A nozzle 4 is secured to the end fitting 3 in the feed cable 1 by suitable means. Preferably the feed cable 1 is made from a unitary hollow current carrying assembly unit including a resilient cable jacket 5 in which a generally tubular, but flexible, cable conductor 6 is positioned, and a flexible metal tube 7 that completes such current carrying member. The cable jacket 5 is made from any suitable insulation material, usually some type of a plastic such as a natural rubber, or a rubber-like material whereas the conductor 6 is made from some flexible, good electrical conductive member, preferably a plurality of cables each comprising a plurality of helically positioned wires, cable strands or wire units suitably woven or twisted together to form a hollow, annular electrically conductive member which is readily flexible after assembly of the cable components. The flexible metal tube 7 may be made, for example, from a helically coiled metal strip, and the tube 7 may be of the type conventionally used for receiving wire conductors and commonly referred to as B-X electrical metal conduit.

As previously indicated, this tubular current carrying unit formed from the insulation jacket 5, the cable conductor 6, and metal tube 7, is readily flexible and the components thereof are intimately bonded together to form an integral unit having desirable flex properties. The unit may be made in any conventional manner.

To provide a desirable shield or protector member for the actual electrode wire to be fed through the feed cable 1, a helically coiled spring 8 is provided within a bore 9 of the metal tube. This spring 8 has an open center bore provided therein for receipt and passage therethrough of the electrode means E used in association with the feed cable assembly.

FIG. 1 of the drawings best shows that the insulation jacket 5 preferably is removed from the cable conductor 6 at its ends as indicated at 10 and 11 in the drawing to expose the cable conductor for contact with the end fittings 2 and 3 or portions of the end fitting assembly for flow of electrical current through the feed cable.

Ends 12 and 13 of the spring 8 preferably are accessible in order to make the final assembly of the feed cable 1. The spring 8 may protrude from the end fittings 2 and 3 when completing the assembly. Note that FIG. 1 brings out the fact that a lubricator hopper 14 is in threaded engagement with the end fitting member 2 and extends through a tapped bore 14a therein to engage the periphery of the coil spring 8 and forceably retain it in position in the bore of the metal tube 7. Likewise, at the other fitting 3, a screw 15 engages a tapped bore or aperture in the end fitting 3 or means associated therewith to engage and bear upon the periphery of the opposite end of the coil spring 8 whereby the end portions of this coil spring can be fixedly positioned in engagement with the end fittings 2 and 3 and associated means. As a feature of the invention, it is desirable to coil the unit formed from the cable conductor 6, jacket 5, and metal tube 7 into about two convolutions prior to securing the second end of the core spring 8 in position so that this core spring has been stretched slightly prior to fixing it in the cable assembly. One end of the spring 8 would be secured to an end fitting member prior to the core action. By such a construction, the cable assembly 1 can thereafter be straightened out and then be flexed in a variety of manners without putting any severe strain on the core spring 8 because of the initial elongation thereof prior to securing the ends in position.

It will be seen that the cable jacket, the conductor and the metal tube form a flexible current carrying unit having a hollow center bore. Obviously, it is desirable and necessary that the outer diameter of the coil spring be appreciably smaller than the inner diameter of this metal tube forming the bore in the flexible current carrying unit so that it is relatively easy to telescope the coil spring into the bore of the flexible current carrying unit in the assembly of the feed cable.

In some instances, it is desirable to use a lower friction center core than the spring 8 so that a resilient, smooth surfaced tube, such as a nylon tube, could be used in place of the spring 8. Any suitable core member can be provided in the nozzle 4.

It is also possible to use other flexible liners in the outer insulated cable unit of the feed cable other than the metal tube 7. Such liner would be flexible and would be integral with the cable conductor 6 and cover 5.

The end fitting 2 has a metal sleeve as one component thereof and it has an end section extending therefrom. Such end section 17 and sleeve 16 are preferably good electrical conductors and can be used in securing the feed cable 1 to welding apparatus or controls.

It will be realized that the original length of the coil spring is such that the coil spring will permit the formation of a plurality, usually two, convolutions in the current carrying unit and with the ends of the coil spring still protruding therefrom or at least substantially extending the length thereof so that the end fittings can be suitably secured to the end portions of the coil spring. A member, such as a set screw 15, engages the end fitting 3 and bears against, or otherwise engages, the coil spring to secure it to the fitting. Any desired trimming of exposed ends of the coil spring would be done after the coil spring has been secured in place as the center portion of the finished electrode feed cable assembly. Preferably both the hopper 14 and the set screw 15 will engage at least a pair of convolutions in the coil spring to avoid excessively stressing a single convolution in the spring.

The end fittings 2 and 3 may be of any suitable construction to aid in securing them in a welding assembly.

Should the core spring 8 be damaged or break when in service, it is not difficult to free the fastening means holding the core spring 8 in place and, the core spring sections or unit can be drawn from ends of the cable assembly so that the spring can be replaced. The feed cable 1 is so made that repair and replacement of the core spring is facilitated, as are general repair operations on the feed cable 1. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A weld electrode feed cable comprising a pair of elongate metal end fittings, a resilient cable jacket, a generally tubular flexible cable conductor positioned within said cable jacket, a flexible metal tube received within said cable conductor and tightly engaged therewith to form a hollow center bore in the cable assembly, a helically coiled core spring loosely and removably received within said metal tube and extending beyond the ends thereof, said end fittings receiving the ends of said cable jacket therein and having the ends of said core spring also received therein, and screw means removably engaging said end fittings and frictionally bearing on said core spring adjacent the ends thereof to maintain them immovably associated with said end fittings and secure said core spring in operative engagement with the remainder of the feed cable.

2. In a flexible weld electrode feed cable, a cable jacket, flexible conductor means positioned within and integral with said cable jacket, and flexible tube means received within said conductor means and tightly engaged therewith to form a hollow center bore in a cable assembly formed from said cable jacket, conductor means and tube means; a flexible core means loosely received within said tube means and having a smaller outer diameter than the inner diameter of said tube means, said core means having a bore for receiving an electrode therein, end fitting sleeves engaging the ends of said cable assembly, and screw means removably engaging said end fitting sleeves and frictionally engaging said core means to secure said core means and said end fitting sleeves in operative engagement with the remainder of the feed cable, said core means being immovably associated with said end fitting sleeves but being movable relative to said cable assembly.

3. A method of making an electrode feed cable comprising providing a flexible current carrying unit having a center bore, inserting a helically wound coil spring into the bore of the current carrying unit, attaching one end of the coil spring to the current carrying unit, forming the current carrying unit into a plurality of convolutions with the other end of the coil spring protruding therefrom, and securing an end member for the feed cable to the current carrying unit by attaching it to the protruding end of the coil spring when the current carrying unit is coiled to form a flexible feed cable assembly.

4. A method of making an electrode feed cable comprising providing a flexible current carrying unit having a metal tube center member, inserting a helically wound coil spring into the bore of the current carrying unit, forming the current carrying unit into a plurality of convolutions with the ends of the coil spring protruding therefrom, and securing the coil spring to the current carrying unit by attaching the protruding ends of the coil spring thereto when the current carrying unit is coiled to form a flexible feed cable assembly.

5. A method of making an electrode feed cable comprising providing a flexible current carrying unit having a tubular center member, inserting a tubular core into the bore of the current carrying unit, said tubular core having an outer diameter smaller than the bore of said center member for radial clearance therebetween, securing one end of the core to the current carrying unit, forming the current carrying unit into a plurality of convolutions, and securing the other end of the tubular core to the current carrying unit to form a flexible feed cable assembly.

References Cited in the file of this patent

UNITED STATES PATENTS 2,819,384   Cornell _____ Jan. 7, 1958

FOREIGN PATENTS 681,889   Great Britain _____ Oct. 29, 1952